United States Patent [19]
Kelley, Jr. et al.

[11] 3,898,997
[45] Aug. 12, 1975

[54] CONTROL ARRANGEMENT FOR A DAMPER

[75] Inventors: Wilson E. Kelley, Jr., Pleasure Ridge Park, Ky.; Robert Wright, Houston, Tex.

[73] Assignee: American Air Filter Company, Inc., Louisville, Ky.

[22] Filed: Mar. 18, 1974

[21] Appl. No.: 452,068

[52] U.S. Cl. ............. 137/624.18; 251/134; 251/30
[51] Int. Cl.² ..................................... F16K 31/02
[58] Field of Search .... 431/62; 137/624.18, 624.11; 251/129, 134, 30

[56] References Cited
UNITED STATES PATENTS
2,550,478   4/1951   Hillebrand et al. ............ 137/624.11
3,135,493   6/1964   Gizeski ........................... 251/134 X
3,520,332   7/1970   Willard ........................... 251/134 X

*Primary Examiner*—Arnold Rosenthal

[57] ABSTRACT

A damper control arrangement wherein a damper blade opens and closes a flow through orifice in response to selective moving means adapted to move the damper blade is preselected distance from the orifice opening varying the opening of the orifice for a predetermined period of time prior to moving the damper blade to a fully open position resulting in the orifice obtaining its maximum opening area.

5 Claims, 1 Drawing Figure

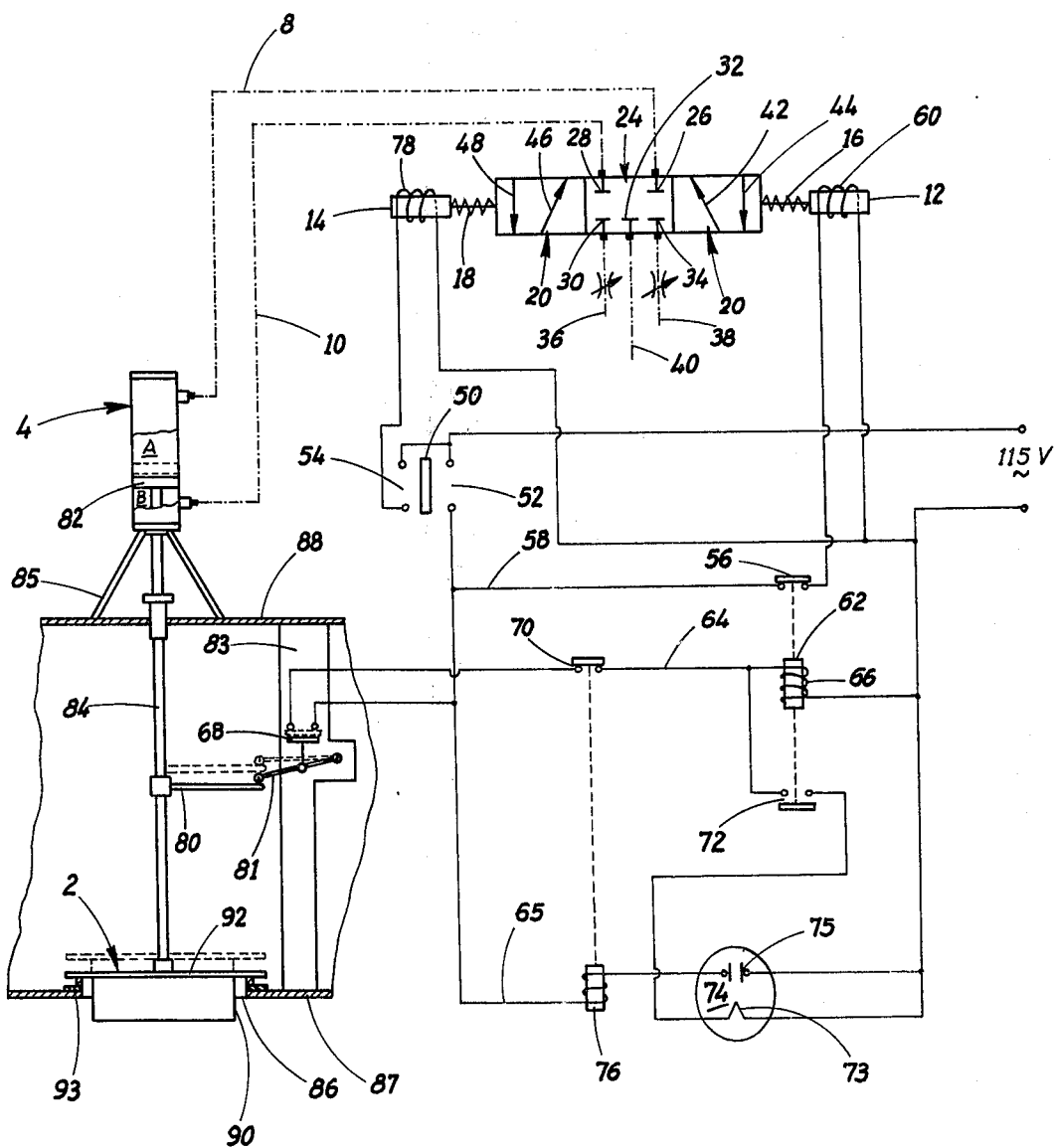

CONTROL ARRANGEMENT FOR A DAMPER

BACKGROUND OF THE INVENTION

This invention relates to a damper control arrangement and in particular relates to a damper control arrangement including means to selectively control the opening and closing of a flow through orifice to provide a selectively buffered transition in a system when starting or stopping fluid flow.

It is desirable to provide for a buffered transition when removing a fluid system from or returning a fluid system to full fluid flow. For example, in the filtering of a gas stream using cloth fabric bags, it is desirable to avoid a sudden surge of fluid when a fluid controlling damper arrangement is activated since sudden surges of fluid may cause the fabric filter bags to snap and consequently weaken the fabric material and cause other undesirable results. This weakening of the fabric is particularly noticeable when the fabric material contains glass fibers as a component thereof. Prior art damper arrangements, such as bullseye dampers and butterfly dampers, can only be made to function satisfactorily by using an expensive time actuating means which causes them to operate very slowly. Even then, butterfly dampers are particularly difficult to use because the fluid flow rate does not change linearly with respect to the change in position of the damper blade, but rather most of the fluid control occurs when the damper blade is nearly parallel to the direction of fluid flow. Less objectionable is the bullseye damper since its flow rate changes linearly over the entire damper blade stroke.

SUMMARY OF THE INVENTION

In the present invention, it is recognized that it is desirable to provide a damper control arrangement which is straightforward, inexpensive, readily constructed and easily maintained.

The present invention advantageously provides a straightforward arrangement for a damper control arrangement which includes means to control the opening and closing of flow through an orifice. The present invention further provides a damper control arrangement which is inexpensive, sturdy, easy and quickly operable, and yet effective during operating conditions. The present invention even further provides a damper control arrangement which is useful where, for example, the gentle inflation of a gas filter bag as it is being put on stream.

Various other features of the present invention will become obvious to those skilled in the art upon reading the disclosure set forth hereinafter.

More particularly, the present invention provides a damper control arrangement comprising:

a. a housing wall having an orifice therein;

b. a damper blade movably positioned selectively between at least one open position and a closed position in relation to the orifice;

c. damper blade moving means in communication with the damper blade for moving the damper blade relative to the housing wall;

d. actuating means operable to actuate the damper blade moving means for movement of the damper blade from one position to another, the actuating means including control means for the damper blade moving means actuated in response to a first control circuit and a second control circuit wherein (1) the first control circuit includes means for energizing the actuating means to a position to cause a selective opening of the orifice by moving the damper blade a preselected distance, means for de-energizing the actuating means once the damper blade has traveled the preselected distance, and a timing device arranged to maintain the damper blade at the preselected distance for a preselected period of time before the actuating means is re-energized whereby the damper blade is actuated to move to a second open position; and, (2) the second control circuit includes means for energizing the actuating means to a position to cause the closing of the damper blade.

It is to be understood that the description of the examples of the present invention given hereinafter are not by way of limitation and various modifications within the scope of the present invention will occur to those skilled in the art upon reading the disclosure set forth hereinafter;

Referring to the drawing:

The FIGURE is an elevational view, partially in crossection, of one preferred embodiment of the invention of this disclosure including an electrical schematic for operating the preferred embodiment.

The FIGURE of the drawing illustrates the structure of a damper assembly 2 operable in response to the operation of a damper blade moving means, exemplified as fluid cylinder 4, the fluid being generally either hydraulic or pneumatic. However, it is realized that the damper blade moving means may be other mechanical means, such as a motorized drive with appropriate gearing. Fluid pressure for operation of the fluid cylinder 4, as exemplified, is supplied from the actuating means, exemplified as a dual coil, three position spring return to center, solenoid valve means 6 which is adapted to supply fluid to compartment A of the cylinder 4 through line 8 and into the other compartment, compartment B, of the fluid cylinder 4 through appropriate conduit piping 10. The compartments A and B of cylinder 4 are defined by the position of the piston means 82, to be discussed hereinafter.

Supply of fluid to the fluid cylinder 4 is determined by the operation of the valve means 6 by the dual coil solenoids 12 and 14. Solenoids 12 and 14 include biasing means 16 and 18, respectively, whereby upon energization of slidable valve portions 20 or 22 the position of the valve portions 20 or 22 within the housing 24 determines which conduit supplies fluid to the selected compartment of the fluid cylinder 4. It is also realized that the exemplified actuating means 6 may be, for example, a reversible starter if the damper moving means 4 is, for example, a motorized drive with appropriate gearing. It will become apparent to those skilled in the art that even further substitutions may be made for the actuating means and the damper moving means which are operable in response to electrical circuitry, which will be discussed hereinafter, without departing from the scope and spirit of the present invention.

The valve means 6 includes five flow through openings 26, 28, 30, 32 and 34 therein in the housing portion 24. Openings 26 and 28 communicate with conduits 8 and 10, respectively, openings 30 and 34 are in communication with exhaust conduits 36 and 38, respectively, and opening 32 is in fluid communication with a fluid supply source conduit 40, conduit 40 supplying the pressurized fluid to the fluid cylinder 4 by means of the control valve 6. It is noted that when solenoid 12 is energized flow through opening 42 is aligned for flow through communication between conduit 40, the supply fluid conduit, and conduit 10 with flow through opening 44 being aligned between openings 26 and 34 to provide for the exhausting of the fluid from the fluid cylinder 4 through fluid conduit 8 and the exhaust conduit 38. Energization of solenoid 14 urges valve portion 22 to a position within control valve means 6 so that flow through opening 46 is aligned with opening 32 and opening 26 thereby providing fluid from conduit 40 to the fluid cylinder 4 through fluid conduit 8 with flow through opening 48 being aligned with opening 28 and 30 providing for flow through communication between conduit 10 and exhaust line 36. When neither of the solenoids 12 nor 14 are energized, the slidable valve portions 20 and 22 are locked in their original positions, as illustrated in the FIGURE, and all openings to the control valve means 6 are closed off.

Means for energizing solenoids 12 and 14 is through electrical circuitry hereinafter referred to as a first control circuit for operation of solenoid 12 and a second control circuit for operation of solenoid 14. Each of the circuits include the three-way main control circuit switch 50, the first control circuit being energized by actuating main control circuit switch 50 to a closed position at contact 52 and the second control circuit being energized by actuating main control circuit switch 50 to a closed position at contact 54.

The first control circuit is comprised of three branch circuits, the first branch including electrical conduit 58 and coil winding 60, coil winding 60 being the actuation winding for solenoid 12. The first branch circuit further includes a normally closed contact relay switch 56 which is operable in response to energization of contact relay 62. Contact relay 62 including winding 66 is energized through the second branch electrical conduit 64 which includes normally open limit switch 68 and normally closed contact switch 70 operable to open in response to a contact relay 76 therein. Thus, as long as the control switch 50 is closed to position 52, coil 60 is maintained energized providing contact relay 62 is de-energized. Upon energization of contact relay 62, normally closed contact switch 56 opens thereby breaking the circuit which supplies electrical energy to the coil winding 60.

Also provided in the second branched electrical circuit is the timing element 73 of timing device 74 and normally open contact switch 72 operable in response to energization of contact relay 62, timing element 73 and switch 72 being in parallel with contact relay coil 66.

The third branch circuit includes a normally open switch 75 actuated to close by the timing out of element 73, the contact relay 76 and the electrical conduit line 65.

Upon closing of the normally open limit switch 68 electrical energy is supplied to coil 66 thereby actuating contact relay 62 closing the normally open contact relay switch 72, opening the normally closed contact switch 56, de-energizing coil 60, and energizing timing element 73. Timing element 73, after a preselected period of time, times out, closing normally open timing switch 75 thereby providing electrical energy for the contact relay 76 which actuates to an open position the normally closed contact switch 70. Opening contact switch 70 de-energizes the contact relay 62 and the contact switch 56 returns to its normally closed position thereby again supplying electrical energy to the solenoid 12 through coil 60.

The second electrical control circuit includes the main control switch 50 situated to a closed position 54 and electrical coil 78 which supplies electrical energy for the operation of the solenoid 14. Thus, when the main control switch 50 is in the closed position at 54, solenoid 14 is operable to provide fluid to the fluid cylinder 4, as discussed previously.

In the first electrical control circuit, the normally open limit switch 68 is operable in response to movement of transversely extending arm 80 which is fixedly attached to the connecting rod 84, connecting rod 84 being disposed between and fixedly attached to the damper assembly 2 at one end and the piston 82 at the other for slidable movement through and in fluid tight relation with an opening in housing 4. Movement of arm 80 against and in contacting relationship with the limit switch contacting arm 81 actuates the limit switch 68 to a closed position thereby energizing the first electrical control circuit as discussed previously.

In the FIGURE, the damper blade 92 is shown in closed position in fluid tight relationship with seal 93 which surrounds orifice 86 in plate 87. Blade 92 is held in position and supported by support frame 85 and transversely extending rod 84 connecting blade 92 to piston 82 within cylinder 4. Cylinder 4 is generally a pneumatic or hydraulic cylinder actuated, as described previously, by control valve means 6 and supported by support frame 85 outside of the fluid passageway. A cylindrical projection 90 is attached on the orifice side of damper blade 92 to provide a fluid passageway of constant cross sectional area during a preselected portion of the stroke of the damper blade 92. This can be seen from the dashed lines in the FIGURE. During a preselected portion of the damper blade stroke cylindrical projection 90 is passed through orifice 86 thereby defining an annular opening between its sidewalls and orifice 86. Also, as can be seen from the FIGURE, during the initial stages of opening of the damper assembly 2, damper blade 92 will be moved upwardly from its fluid tight position on seal 93. When this happens, cylindrical projection 90 remains in juxtaposition with orifice 86 and a constant flow of fluid will be allowed to pass through damper assembly 2 between the annular space between the cylindrical projection 90 and the plate defining orifice 86. Cylindrical projection 90 therefore acts as a buffer which in effect provides for a smooth transition when, for example, cloth filter bags are being returned on stream after cleaning. In normal operation, for example, with a baghouse including a plurality of cloth filter bags, the amount of initial opening of the orifice 86 is only one or two inches before the contacting arm 81 is contacted by the transversely extending arm 80 which stops the movement of the damper assembly 2.

It is realized that the damper assembly may take on other shapes and structures, such as those described in U.S. Pat. No. 3,752,439. However, it is noted that in the utilization of the damper assembly 2, as previously described, a variable orifice is defined during the upward movement of the damper assembly 2. The varying orifice is then stopped at a preselected distance or partially open position, in relation to the opening 86 in the wall 87. The preselected damper assembly 2 remains in this partially open position before actuating means becomes operable and forces the damper assembly 2 to its fully open position.

It will be realized that various changes may be made to the specific embodiment shown and described without departing from the scope and principles of the present invention.

What is claimed is:

1. A damper control arrangement comprising:
   a. a housing wall having an orifice therein;
   b. a damper blade movably positioned selectively between at least one open position and a closed position in relation to said orifice;
   c. damper blade moving means in communication with said damper blade for moving said damper blade relative to said housing wall;
   d. actuating means operable to actuate said damper blade moving means for movement of said damper blade from one position to another, said actuating means including control means for said damper blade moving means actuated in response to a first control circuit and a second control circuit wherein (1) said first control circuit includes a normally open switch means closed to a first position, said switch means in said first closed position being in series with two branch circuits in parallel, the first of said branch circuits including a normally closed first contact switch and a first contactor actuating means whereby said first contactor actuating means actuates said actuating means to a first position upon closing said normally open switch, the second of said branches including a normally open limit switch and a first contact relay which operates said normally closed first contact switch, said normally open limit switch being operable in response to selected movement of said damper blade whereby when said damper blade moves a preselected distance said limit switch is actuated to a closed position thereby energizing said contact relay which opens said normally closed first contact switch, de-actuating said first contactor actuating means which in turn de-actuates said actuating means to its original position; and, (2) said second control circuit includes said normally open switch means closed to a second position and a second contactor actuating means whereby said second contactor actuating means actuates said actuating means to a second position upon closing said normally open switch means.

2. The damper control arrangement of claim 1 wherein said second branch circuit of said first control circuit includes a normally closed second contact switch operable in response to a second contact relay, a timing element, and a normally open third contact switch operable to a closed position in response to energization of said first contact relay, said timing element and third contact switch being in parallel with said first contact relay, said first control circuit further including a third branch circuit in parallel with said first and second branch circuits, said third branch circuit including said second contact relay and a normally open timing switch, said timing switch being operable to a closed position in response to actuation by said timing element whereby upon energizing said second contact relay said normally closed second contact switch opens thereby de-energizing said first contact relay and closing said normally closed first contact switch, actuating said first contactor actuating means.

3. The damper control arrangement of claim 1 wherein said damper blade moving means includes a housing having a plurality of openings and a slidably mounted piston therein with a transversely extending rod attached at one end to said piston and at the other end to said damper blade, said rod extending through one of said openings in said housing for slidable movement therethrough in a substantially fluid tight communication, said piston being of substantially the same geometric configuration and substantially the same cross sectional area as the inside configuration of said housing whereby said piston separates said housing into two compartments in substantially non-flow through relation; at least two of said openings being disposed in substantially opposite ends of said housing in fluid communication with fluid pressure means whereby fluid pressure on one side of said piston actuates said damper blade for movement in one direction and fluid pressure on the other side of said piston actuates said damper blade for movement in an opposite direction.

4. The damper control arrangement of claim 1 wherein said damper blade includes a baffle means positioned thereon in cooperative arrangement with said orifice to provide a flow through opening defined by a edge of said orifice and said baffle means of constant cross section during a predetermined portion of the damper blade stroke.

5. A damper control arrangement comprising:
   a. a housing wall having an orifice therein;
   b. a damper blade movably positioned selectively between at least one open position and a closed position in relation to said orifice;
   c. damper blade moving means in communication with said damper blade for moving said damper blade relative to said housing wall;
   d. actuating means operable to actuate said damper blade moving means for movement of said damper blade from one position to another, said actuating means including control means for said damper blade moving means actuated in response to a first control circuit and a second control circuit wherein (1) said first control circuit includes means for energizing the actuating means to a position to cause the selective opening of the orifice by moving said damper blade a preselected distance, means for de-energizing the actuating means once said damper blade has traveled said preselected distance, and a timing device arranged to maintain said damper blade at said preselected distance for a preselected period of time before said actuating means is re-energized whereby said damper blade is actuated to move to a second open position; and, (2) said second control circuit includes means for energizing said actuating means to a position to cause the closing of said damper blade.

\* \* \* \* \*